United States Patent [19]

Ito et al.

[11] 4,401,072
[45] Aug. 30, 1983

[54] COMBUSTION CHAMBER OF A COMPRESSION-IGNITION TYPE INTERNAL COMBUSTION ENGINE

[75] Inventors: Sumio Ito, Gotenba; Teruo Kumai, Susono; Hisashi Oki, Numazu; Toshio Tanahashi, Toyota, all of Japan

[73] Assignee: Toyota Jidosha Kabushiki Kaisha, Toyota, Japan

[21] Appl. No.: 227,385

[22] Filed: Jan. 22, 1981

Related U.S. Application Data

[62] Division of Ser. No. 49,915, Jun. 19, 1979, abandoned.

[30] Foreign Application Priority Data

Mar. 12, 1979 [JP] Japan .................................. 54-27607

[51] Int. Cl.³ .............................................. F02B 3/00
[52] U.S. Cl. .................................. 123/292; 123/275; 123/256; 123/279
[58] Field of Search ............... 123/292, 308, 296, 302, 123/26, 275

[56] References Cited

U.S. PATENT DOCUMENTS

| | | | |
|---|---|---|---|
| 2,091,412 | 8/1937 | Mallory | 123/292 |
| 3,809,030 | 5/1974 | Molroux | 123/292 |
| 4,223,645 | 9/1980 | Nohira | 123/292 |
| 4,237,826 | 12/1980 | Motosugi et al. | 123/292 |

FOREIGN PATENT DOCUMENTS 2575 of 1908 United Kingdom ................. 123/292

Primary Examiner—Ronald B. Cox
Attorney, Agent, or Firm—Kenyon & Kenyon

[57] ABSTRACT

A compression-ignition type internal combustion engine comprising a combustion chamber and an accumulation chamber which are interconnected to each other via an accumulation valve. The opening operation of the accumulation valve is controlled so that the accumulation valve remains opened during the compression stroke. In the first half of the compression stroke, a jet of air is spouted into the combustion chamber from the accumulation chamber to create a strong swirl motion in the combustion chamber. In the latter half of the compression stroke, the air in the combustion chamber flows into the accumulation chamber where the air is accumulated under high pressure, which air is then spouted from the accumulation chamber into the combustion chamber at the next cycle.

19 Claims, 11 Drawing Figures

COMBUSTION CHAMBER OF A COMPRESSION-IGNITION TYPE INTERNAL COMBUSTION ENGINE

This is a division of application Ser. No. 049,915 filed on June 19, 1979 and now abandoned.

DESCRIPTION OF THE INVENTION

The present invention relates to a combustion chamber of a compression-ignition type internal combustion engine.

In a compression-ignition type internal combustion engine, it is important to form a mixture as completely and rapidly as possible of sucked air and fuel which is injected from a fuel injector. To this end, a conventional direct injection type engine has such a construction that a swirl motion is compulsorily created in the combustion chamber by using a helically shaped intake port or a shroud valve, thereby promoting the vaporization of the fuel injected from the fuel injector by the swirl motion thus created. However, in the case wherein such a helically shaped intake port or shroud valve is used, since the flow resistance which the air fed into the cylinder is subjected to is increased, a problem occurs in that the volumetric efficiency is reduced when an engine is operating at a high speed under a heavy load. In addition, in such a case, since a swirl motion created in the intake stroke is attenuated at the end of the compression stroke at which the injecting operation of the fuel injector is started, a problem also occurs in that it is impossible to fully promote the vaporization of the fuel injected from the fuel injector.

One method of creating a strong swirl motion at the end of the compression stroke is that of spouting the squish flow into the combustion chamber. However, since the squish flow does not have as great a momentum as the swirl motion has, the swirl motion created by the squish flow is immediately attenuated. As a result of this, since it is impossible to shorten the combustion duration, the temperature of the exhaust gas is increased and, thus, a problem occurs in that the thermal efficiency is reduced. In addition, there is an engine comprising a vortex chamber connected to the main chamber via a connecting passage for creating a strong vortex in the vortex chamber at the compression stroke. In this engine, a strong vortex is created in the vortex chamber by air flowing into the vortex chamber from the main chamber via the connecting passage, and fuel is injected from the fuel injector into the vortex of the air. In such an engine equipped with a vortex chamber, in order to create a strong vortex in the vortex chamber, it is necessary to reduce the cross-sectional area of the connecting passage. However, if the cross-sectional area of the connecting passage is reduced, a problem occurs in that there is an increase in the loss of the output power, which is caused by the work necessary to force air into the vortex chamber via the connecting passage.

An object of the present invention is to provide a compression-ignition type internal combustion engine capable of completely and rapidly forming a mixture of sucked air and fuel injected from the fuel injector by creating a strong swirl motion which is maintained during the time the combustion is carried out.

According to the present invention, there is provided a compression-ignition type internal combustion engine comprising: a cylinder block having a cylinder bore therein; a cylinder head mounted on said cylinder block and having a cavity therein; a piston reciprocally movable in said cylinder bore; a combustion chamber formed between said cylinder head and said piston, said cavity having a port connected to said combustion chamber; an intake valve movably mounted on said cylinder head for leading air into said combustion chamber; an exhaust valve movably mounted on said cylinder head for discharging exhaust gas into the atmosphere; fuel supply means arranged in said combustion chamber; and a valve means for opening said port of the cavity during the compression stroke to spout a jet of gas under pressure into said combustion chamber from said cavity during the first half of the compression stroke.

The present invention may be more fully understood from the following description of preferred embodiments of the invention, together with the accompanying drawings.

DESCRIPTION OF PREFERRED EMBODIMENTS

Referring to FIGS. 1 through 4, 1 designates an engine body, 2 a cylinder block, 3 a piston reciprocally movable in a cylinder bore 4 formed in the cylinder block 2; 5 designates a cylinder head fixed onto the cylinder block 2 via a gasket 6; 7 designates a combustion chamber formed between the flat top face of the piston 3 and the flat inner wall of the cylinder head 5; 8 designates an intake valve, 9 an intake port, 10 an exhaust valve, and 11 an exhaust port. A spherical recess 12 is formed in the upper portion of the piston 3, and a fuel injector 13 mounted on the cylinder head 5 is so arranged that a fuel injection nozzle 14 thereof is exposed within the spherical recess 12. The injecting operation of the fuel injector 13 is started at about 20 degrees before top dead center in the compression stroke, and, at this time, the fuel is injected from the fuel injection nozzle 14 so that it moves forward along the inner wall of the spherical recess 12.

Figure 1:
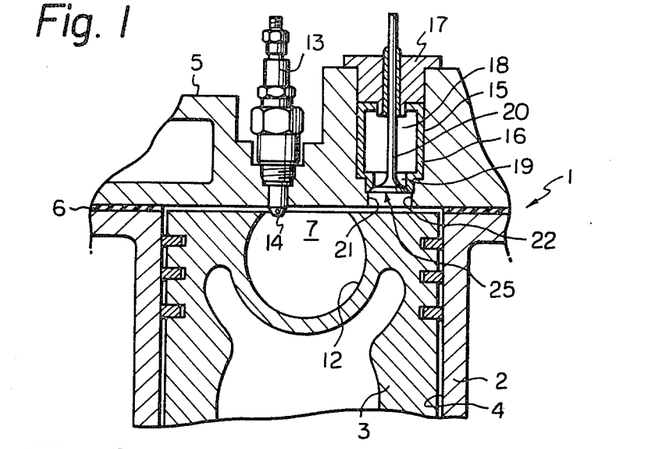
FIG. 1 is a cross-sectional side view of an embodiment of an internal combustion engine according to the present invention, taken along the line I—I in FIG. 3.
Figure 2:
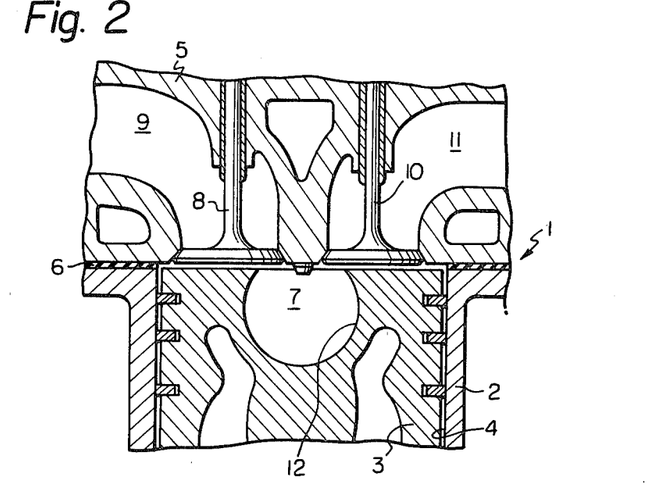
FIG. 2 is a cross-sectional side view taken along the line II—II in FIG. 3.
Figure 3:
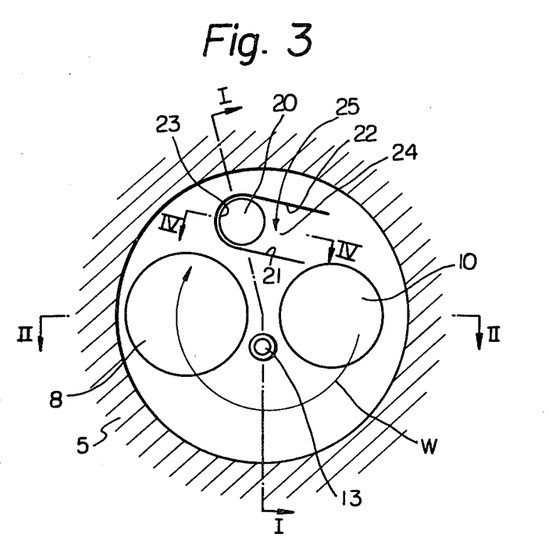
FIG. 3 is a bottom view of the cylinder head illustrated in FIG. 1.
Figure 4:
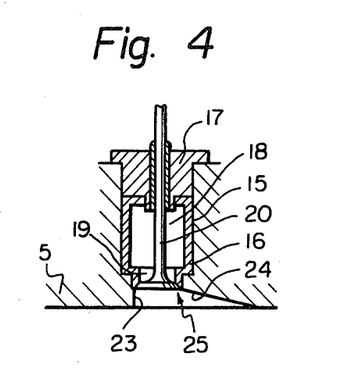
FIG. 4 is a cross-sectional view taken along the line IV—IV in FIG. 3.

As is illustrated in FIGS. 1 and 4, a cylindrical hollow sleeve 16 is fitted into a circular hole 15 formed in the cylinder head 5 and fixed onto the cylinder head 5 by means of a fixing member 17. An accumulation chamber 18 is formed in the hollow sleeve 16, and an accumulation valve 20 cooperating with a valve port 19 is arranged at the lower end of the hollow sleeve 16 so as to open and close the valve port 19. A groove 25 defined by a pair of vertical walls 21, 22, a semi-cylindrical wall 23, and an inclined bottom wall 24 is formed on the inner wall of the cylinder head 5, beneath the accumulation valve 20, and the groove 25 is formed so as to extend in the circumferential direction of the combustion chamber 7. As is illustrated in FIG. 4, the semi-cylindrical wall 23 is arranged at a position closely adjacent to the peripheral edge of the valve head of the accumulation valve 20 so that, when the accumulation valve 20 is opened, the gas in the combustion chamber 7 flows into the accumulation chamber 18 via an opening formed between the accumulation valve 20 and its valve seat at a position located in the right side in FIG. 3; or the gas in the accumulation chamber 18 flows into the combustion chamber 7 via the above-mentioned opening. Consequently, when the gas flows into the combustion chamber 7 from the accumulation chamber 18, the gas flows along the groove 25 and, as a result, a swirl motion is created in the combustion chamber 7 as illustrated by the arrow W in FIG. 3.

Figure 5:
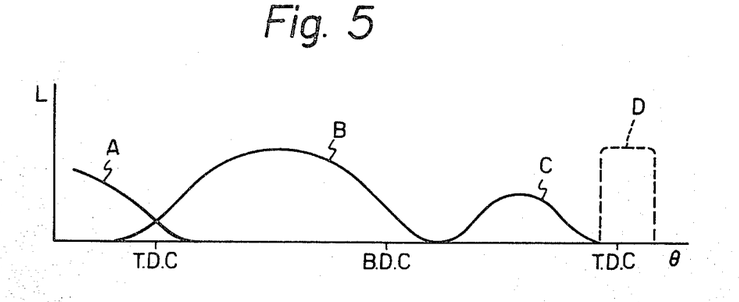
FIG. 5 is a graph showing the opening times of the intake valve, the exhaust valve, and the accumulation valve.

FIG. 5 shows the opening time of the exhaust valve 10, the intake valve 8 and the accumulation valve 20. In FIG. 5, the ordinate L indicates valve lift and the abscissa θ indicates crank angle. In addition, in FIG. 5, the curved lines A, B, and C indicate the opening time of the exhaust valve 10, the intake valve 8, and the accumulation valve 20, respectively. Furthermore, in FIG. 5, the broken line D indicates injection time of the fuel injector 13. From FIG. 5, it will be understood that the accumulation valve 20 is opened at the beginning of the compression stroke at a crank angle near a crank angle at which the intake valve 8 is closed, and that the accumulation valve 20 is closed at the end of the compression stroke at a crank angle near a crank angle at which the injecting operation of the fuel injector 13 is started.

In operation, at the time of the intake stroke, air is introduced into the combustion chamber 7 via the intake valve 8. After this, when the intake valve 8 is closed and the piston 3 starts the compressing action of the air in the combustion chamber 7, the accumulation valve 20 is opened. As is hereinafter described, air having a high temperature and a high pressure and introduced into the accumulation chamber 18 at the compression stroke in the preceding cycle is accumulated in the accumulation chamber 18; on the other hand, the pressure in the combustion chamber 7 is lower than the atmospheric pressure at the start of the compression stroke. Consequently, the difference between the pressures in the combustion chamber 7 and the accumulation chamber 18 is large. Thus, when the accumulation valve 20 is opened, the air accumulated in the accumulation chamber 18 is spouted into the combustion chamber 7 at a high speed. As a result of this, a strong swirl motion shown by the arrow W in FIG. 3 is created in the combustion chamber 7. Then, as the piston 3 further moves upwards, since the pressure in the accumulation chamber 18 is maintained higher than that in the combustion chamber 7 for a while, the air in the accumulation chamber 18 continues to be spouted into the combustion chamber 7. As a result of this, the swirl motion created in the combustion chamber 7 is further strengthened. When the piston 3 further moves upwards and the pressure in the accumulation chamber 18 becomes equal to that in the combustion chamber 7, the spouting operation of the air in the accumulation chamber 18 is stopped. After this, when the piston 3 further moves upwards, since the pressure in the combustion chamber 7 becomes higher than that in the accumulation chamber 18, the air in the combustion chamber 7 flows into the accumulation chamber 18. As mentioned previously, the accumulation valve 20 remains opened until the piston 3 reaches a position corresponding to a crank angle near the crank angle at which the injecting operation of the fuel injector 13 is started. In addition, the pressure in the combustion chamber 7 is maintained approximately equal to that in the accumulation chamber 18 during the time in which the air in the combustion chamber 7 flows into the accumulation chamber 18, and the pressure in the combustion chamber 7 reaches a high level when the piston 3 reaches a position corresponding to the crank angle at which the injecting operation of the fuel injector 13 is started. Consequently, when the accumulation valve 20 is closed, air having a high temperature and a high pressure is accumulated in the accumulation chamber 18. This air having a high pressure and a high temperature is spouted into the combustion chamber 7 at the next cycle to create a strong swirl motion W in the combustion chamber 7.

The injecting operation of the fuel injected from the fuel injector 13 towards the spherical recess 12 is started immediately after or before the accumulation valve 20 is closed. At this time, since a strong swirl motion is created in the combustion chamber 7 as mentioned above, the fuel injected from the fuel injector 13 is instantaneously vaporized, and, thus, a mixture of air and fuel is completely and rapidly formed. Consequently, as soon as the injecting operation of the fuel injector 13 is started, the self-ignition of the mixture is caused. As a result of this, since the ignition lag is extremely shortened, diesel knocking can be prevented from occurring. The injecting operation of the fuel injector 13 continues to be carried out after the piston 3 passes through the top dead center, as illustrated by the broken line D in FIG. 5. However, since the strong swirl motion created in the combustion chamber 7 in the first half of the compression stroke continues to be maintained after the piston 3 passes through the top dead center, the fuel injected from the fuel injector 13 is rapidly burned. As a result of this, since the combustion duration is shortened, the temperature of the exhaust gas is reduced, and, thus, the thermal efficiency can be improved.

Figure 6:
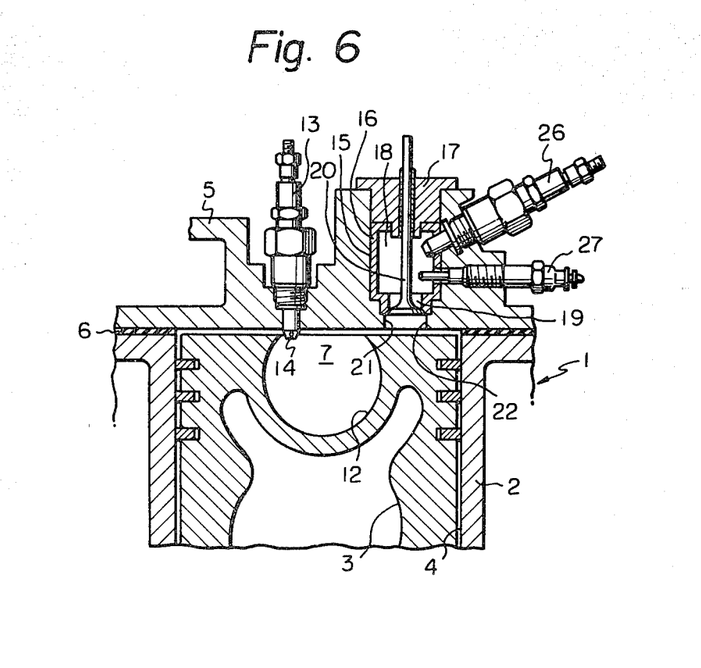
FIG. 6 is a cross-sectional side view of another embodiment according to the present invention.
Figure 7:
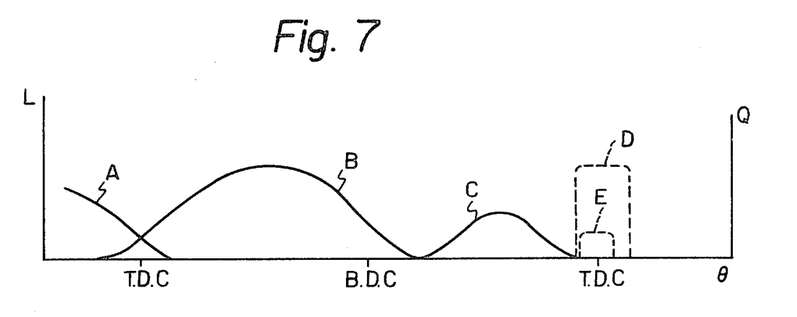
FIG. 7 is a graph showing an injection time of the fuel injector and the opening times of the intake valve, the exhaust valve, and the accumulation valve.

FIG. 6 illustrates another embodiment according to the present invention. In this embodiment, an auxiliary fuel injector 26 and a glow plug 27 are arranged in the accumulation chamber 18. FIG. 7 shows the injection times of the fuel injector 13 and the auxiliary fuel injector 26 and the opening times of the exhaust valve 10, the intake valve 8, and the accumulation valve 20. In FIG. 7, the ordinates L and Q indicate valve lift and amount of fuel injected from the injector, respectively, and the abscissa θ indicates crank angle. In addition, in FIG. 7, the curved lines A, B, and C indicate the opening time of the exhaust valve 10, the intake valve 8, and the accumulation valve 20, respectively. From FIGS. 5 and 7, it will be understood that the opening time of the accumulation valve 20 is the same as that of the accumulation valve in the embodiment illustrated in FIG. 1. Furthermore, in FIG. 7, the broken lines D and E indicate the amount of fuel injected from the fuel injector 13 and the auxiliary fuel injector 26, respectively. From FIG. 7, it will be understood that the injecting operation of the auxiliary fuel injector 26 is started after the injecting operation of the fuel injector 20 is started. In addition, it is preferable that the amount of fuel injected from the auxiliary fuel injector 26 be increased when the engine is started.

As mentioned previously, air having a high temperature and a high pressure is accumulated in the accumulation chamber 18. In this embodiment, since the fuel is injected from the auxiliary fuel injector 26 into the air accumulated in the accumulation chamber 18, the fuel injected from the auxiliary fuel injector 26 is instantaneously vaporized. Besides, the mixture thus formed is reformed during the time it is accumulated in the accumulation chamber 18 under high temperature and high pressure. Consequently, in this embodiment, since the reformed mixture is spouted into the combustion chamber 7 from the accumulation chamber 18 in the first half of the compression stroke, the self-ignition of the reformed mixture is caused at the end of the compression stroke before the self-ignition of the mixture which is formed by the fuel injected from the fuel injector 13 is caused. As a result of this, the ignition lag can be further shortened.

Figure 8:
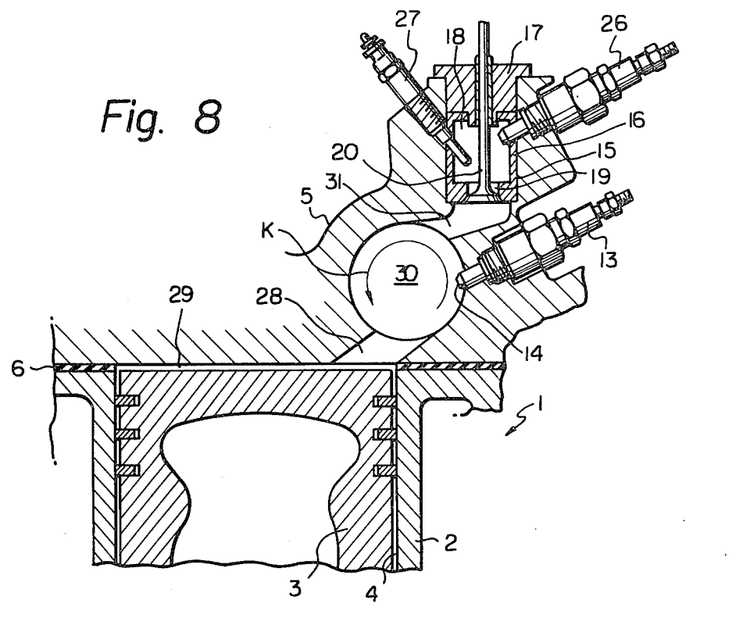
FIG. 8 is a cross-sectional side view of a further embodiment according to the present invention.
Figure 9:
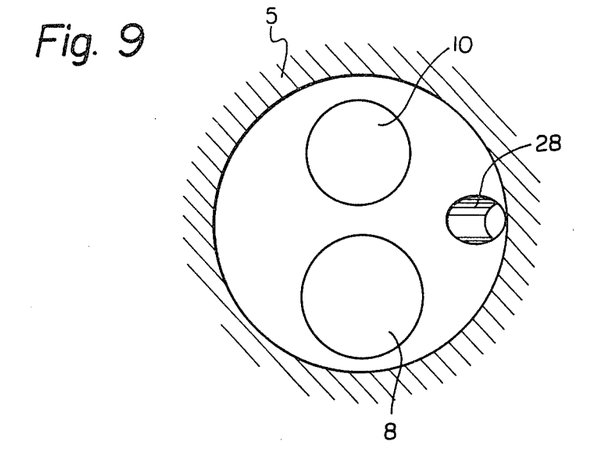
FIG. 9 is a bottom view of the cylinder head illustrated in FIG. 8.

FIGS. 8 and 9 illustrate a further embodiment according to the present invention. In this embodiment, a spherically shaped vortex chamber 30 connected to a main chamber 29 via a connecting passage 28 is formed in the cylinder head 5, and the fuel injector 13 is arranged in the vortex chamber 30. In addition, the connecting passage 28 is tangentially connected to the inner wall of the vortex chamber 30. The accumulation chamber 18 is connected to the vortex chamber 30 via an accumulation valve 20 and a mixture passage 31, and the auxiliary fuel injector 26 and the glow plug 27 are arranged in the accumulation chamber 18. In addition, the mixture passage 31 is tangentially connected to the inner wall of the vortex chamber 30 and has an opening directed towards the direction K which is the same as the direction towards which the opening of the connecting passage 28 is directed. Furthermore, the opening time of the accumulation valve 20 and the injecting times of the fuel injector 13 and the auxiliary fuel injector 26 are as shown by the curved line C and the broken lines D and E in FIG. 7, respectively. In this embodiment, during the compression stroke, air is forced into the vortex chamber 30 from the main chamber 29 via the connecting passage 28, and, as a result, a vortex shown by the arrow K in FIG. 8 is created in the vortex chamber 30. This vortex K is further strengthened by the reformed mixture spouted into the vortex chamber 30 from the accumulation chamber 18 in the first half of the compression stroke. In addition, after the reformed mixture swirls along the inner wall of the vortex chamber 30, a part of the reformed mixture is collected around the fuel injection nozzle 14 of the fuel injector 13. Then, since the self-ignition of the above-mentioned part of the reformed mixture is initially caused, the fuel injected from the fuel injection nozzle 14 rapidly spreads within the vortex chamber 30 while being burned. As a result of this, the combustion duration is extremely shortened. In addition, since a strong vortex is created in the vortex chamber 30 by the reformed mixture spouted from the accumulation chamber 18, it is possible to create a strong vortex in the vortex chamber 30 without reducing the cross-sectional area of the connecting passage 28. In this embodiment, since it is possible to increase the cross-sectional area of the connecting passage 28, the loss of output power, which is caused by the work necessary to force the air into the vortex chamber 30 via the connecting passage 28, can be reduced.

Figure 10:
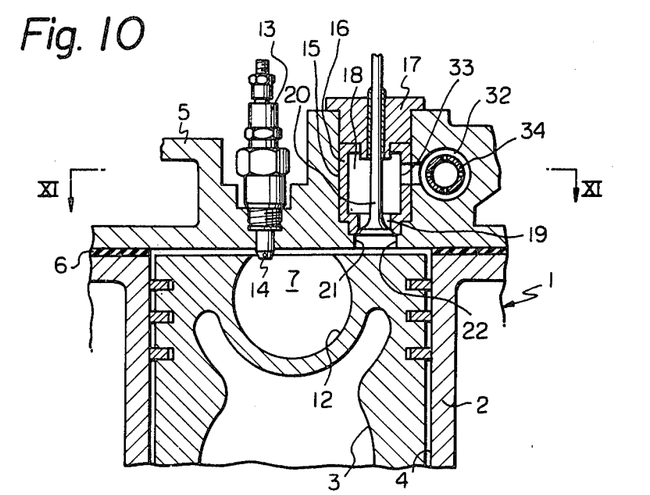
FIG. 10 is a cross-sectional side view of a still further embodiment according to the present invention.
Figure 11:
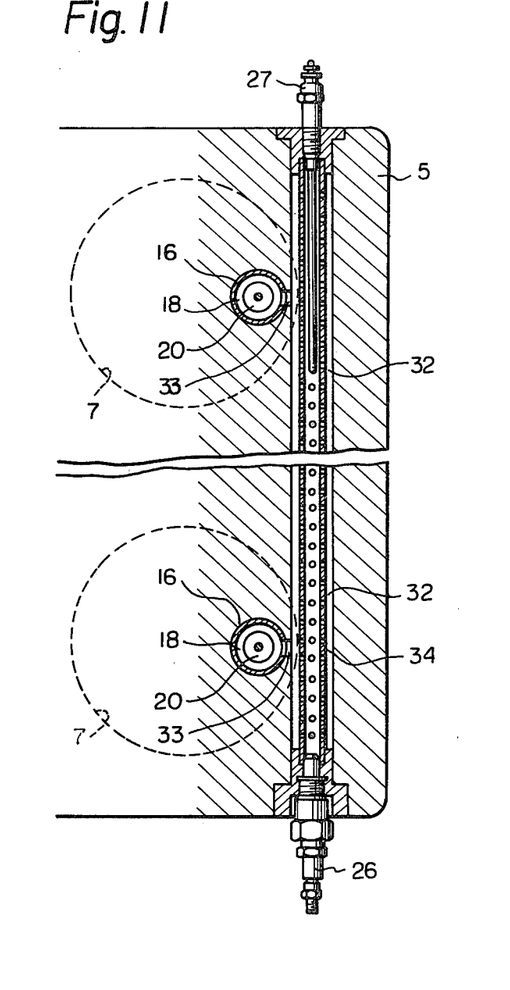
FIG. 11 is a cross-sectional plan view taken along the line XI—XI in FIG. 10.

FIGS. 10 and 11 illustrate the case wherein the present invention is applied to a multi-cylinder compression-ignition type engine. In this embodiment, a common connecting passage 32 extending in the longitudinal direction of the cylinder head 5 is formed in the cylinder head 5, and the accumulation chamber 18 of each cylinder is connected to the common connecting passage 32 via a corresponding branch passage 33. Consequently, in this embodiment, the accumulation chambers 18 are interconnected to each other via the common connecting passage 32. In addition, a perforated tube 34 extending over the entire length of the common connecting passage 32 is inserted into the common connecting passage 32. The auxiliary fuel injector 26 is arranged at one end of the perforated tube 34, and the glow plug 27 is arranged at the other end of the perforated tube 34. In this embodiment, the opening time of the accumulation valves 20 and the injection times of the fuel injectors 13 and the auxiliary fuel injector 16 are as shown by the curved line C and the broken lines D and E in FIG. 7. Consequently, the fuel is injected from the auxiliary fuel injector 26 everytime one of the accumulation valves 20 is closed. At this time, since the fuel is injected from the auxiliary fuel injector 26 into the perforated tube 34, the fuel thus injected is uniformly distributed within the common connecting passage 32. On the other hand, in this embodiment, the air accumulated in the accumulation chamber 18 of a given cylinder is fed into the accumulation chambers 18 of the remaining cylinders via the common connecting passage 32, together with the fuel injected from the auxiliary fuel injector 26, and then spouted into the combustion chamber 7. As mentioned above, since the air flows within the common connecting passage 32 from the accumulation chamber 18 of a given cylinder towards the accumulation chambers 18 of the remaining cylinders at a high speed, the air is fully mixed with the fuel injected from the auxiliary fuel injector 26, and, at the same time, the vaporization of the fuel is promoted. Consequently, the air-fuel ratios of the mixtures spouted into the combustion chambers 7 from the accumulation chambers 18 become uniform, and the velocities of the mixtures spouted from the accumulation chambers 18 into the combustion chambers 7 become uniform. As a result of this, the irregularity of combustion in each cylinder can be greatly reduced.

According to the present invention, since a strong swirl motion, which continues to be maintained during the time the combustion is carried out, is carried in the combustion chamber, the mixture of air and fuel injected from the fuel injector can be completely and rapidly created. As a result, since the ignition lag is shortened, it is possible to prevent a diesel knocking from occurring. In addition, since the combustion duration is shortened, it is possible to improve the thermal efficiency. Furthermore, in the case wherein the reformed mixture is spouted from the accumulation chamber, the ignition lag can be further shortened.

While the invention has been described by reference to specific embodiments chosen for purposes of illustration, it should be apparent that numerous modifications could be made thereto by those skilled in the art without departing from the spirit and scope of the invention.

What is claimed is:

1. A compression-ignition type internal combustion engine comprising:
   a cylinder block having a cylinder bore therein;
   a cylinder head mounted on said cylinder block and having a cavity therein;
   a piston reciprocally movable in said cylinder bore;
   a combustion chamber formed between said cylinder head and said piston, said cavity having a port connected to said combustion chamber;
   an intake valve movably mounted on said cylinder head for leading air into said combustion chamber;
   an exhaust valve movably mounted on said cylinder head for discharging exhaust gas into the atmosphere;
   a fuel supply means arranged in said combustion chamber;
   an auxiliary fuel injector arranged in said cavity; and
   a valve means for opening said port of the cavity during the compression stroke to spout a jet of gas under pressure into said combustion chamber from said cavity during the first half of the compression stroke, wherein said valve means is opened at a crank angle near a crank angle at which said intake valve is closed, said valve means being closed at a crank angle near a crank angle at which the injecting operation of said fuel supply means is started.

2. A compression-ignition type internal combustion engine comprising:
   a cylinder block having a cylinder bore therein;
   a cylinder head mounted on said cylinder block and having a cavity therein;
   a piston reciprocally movable in said cylinder bore;
   a combustion chamber formed between said cylinder head and said piston, said cavity having a port connected to said combustion chamber;
   an intake valve movably mounted on said cylinder head for leading air into said combustion chamber;
   an exhaust valve movably mounted on said cylinder head for discharging exhaust gas into the atmosphere;
   a fuel injector arranged in said combustion chamber;
   an auxiliary fuel injector arranged in said cavity; and
   a valve means for opening said port of the cavity during the compression stroke to spout a jet of gas under pressure into said combustion chamber from said cavity during the first half of the compression stroke, wherein said piston has a spherical recess formed in an upper portion thereof, said fuel injector having a fuel injector nozzle which is directed tangentially to an inner wall of said recess.

3. A compression-ignition type internal combustion engine comprising:
   a cylinder block having a cylinder bore therein;
   a cylinder head mounted on said cylinder block and having a cavity therein;
   a piston reciprocally movable in said cylinder bore;
   a combustion chamber formed between said cylinder head and said piston, said cavity having a port connected to said combustion chamber;
   an intake valve movably mounted on said cylinder head for leading air into said combustion chamber;
   an exhaust valve movably mounted on said cylinder head for discharging exhaust gas into the atmosphere;
   a fuel supply means arranged in said combustion chamber;
   an auxiliary fuel injector arranged in said cavity; and
   a valve means for opening said port of the cavity during the compression stroke to spout a jet of gas under pressure into said combustion chamber from said cavity during the first half of the compression stroke, wherein the injecting operation of said auxiliary fuel injector is started after the injecting operation of said fuel injector is started.

4. A compression-ignition type internal combustion engine comprising:
   a cylinder block having a cylinder bore therein;
   a cylinder head mounted on said cylinder block and having a cavity therein;
   a piston reciprocally movable in said cylinder bore;
   a combustion chamber formed between said cylinder head and said piston, said cavity having a port connected to said combustion chamber;
   an intake valve movably mounted on said cylinder head for leading air into said combustion chamber;
   an exhaust valve movably mounted on said cylinder head for discharging exhaust gas into the atmosphere; a fuel supply means arranged in said combustion chamber;
   an auxiliary fuel injector arranged in said cavity; and
   a valve means for opening said port of the cavity during the compression stroke to spout a jet of gas under pressure into said combustion chamber from said cavity during the first half of the compression stroke, wherein said combustion chamber comprises a main chamber and a vortex chamber which are interconnected to each other via a connecting passage, said cavity being connected to said vortex chamber via a gas passage.

5. A compression-ignition type internal combustion engine comprising:
   a cylinder block having a cylinder bore therein;
   a cylinder head mounted on said cylinder block and having a cavity therein;
   a piston reciprocally movably in said cylinder bore;
   a combustion chamber formed between said cylinder head and said piston, said cavity having a port connected to said combustion chamber;
   an intake valve movably mounted on said cylinder head for leading air into said combustion chamber;
   an exhaust valve movably mounted on said cylinder head for discharging exhaust gas into the atmosphere;
   a fuel supply means arranged in said combustion chamber;
   an auxiliary fuel injector arranged in said cavity; and
   a valve means for opening said port of the cavity during the compression stroke to spout a jet of gas under pressure into said combustion chamber from said cavity during the first half of the compression stroke, wherein said engine comprises a common connecting passage and a plurality of cylinders each having one of said cavities which is connected to said common connecting passage.

6. A compression-ignition type internal combustion engine as claimed in claim 1, wherein said engine further comprises guide means for guiding said jet of air to create a strong swirl motion in said combustion chamber.

7. A compression-ignition type internal combustion engine as claimed in claim 6, wherein said guide means comprises a guide passage.

8. A compression-ignition type internal combustion engine as claimed in claim 7, wherein said guide passage is a groove formed in an inner wall of said cylinder head.

9. A compression-ignition type internal combustion engine as claimed in claim 8, wherein said valve means comprises a poppet valve having a valve head which is directly exposed to said combustion chamber, said groove being formed by a pair of vertical walls and a semi-cylindrical wall located at a position closely adjacent to the peripheral edge of said valve head.

10. A compression-ignition type internal combustion engine as claimed in claim 8, wherein said groove extends to the circumferential direction of said combustion chamber.

11. A compression-ignition type internal combustion engine as claimed in claim 1, wherein said fuel supply means comprises a fuel injector arranged in said combustion chamber.

12. A compression-ignition type internal combustion engine as claimed in claim 11, wherein said engine further comprises a glow plug arranged in said cavity.

13. A compression-ignition type internal combustion engine as claimed in claim 4, wherein said fuel supply means comprises a fuel injector arranged in said vortex chamber.

14. A compression-ignition type internal combustion engine as claimed in claim 4, wherein said fuel supply means comprises a fuel injector arranged in said main chamber and an auxiliary fuel injector arranged in said vortex chamber.

15. A compression-ignition type internal combustion engine as claimed in claim 4, wherein said connecting passage is tangentially connected to an inner wall of said vortex chamber and has an opening which is directed towards a circumferential direction of said vortex chamber.

16. A compression-ignition type internal combustion engine as claimed in claim 15, wherein said gas passage is tangentially connected to the inner wall of the vortex chamber and has an opening directed to the circumferential direction towards which the opening of said connecting passage is directed.

17. A compression-ignition type internal combustion engine as claimed in claim 5, wherein said fuel supply means comprises a fuel injector arranged in said combustion chamber, and an auxiliary fuel injector arranged in said common connecting passage.

18. A compression-ignition type internal combustion engine as claimed in claim 17, wherein a perforated tube extending over the entire length of said common connecting passage is arranged in said common connecting passage, said auxiliary fuel injector being arranged in said perforated tube.

19. A compression-ignition type internal combustion engine as claimed in claim 6, wherein said engine further comprises a glow plug arranged in said common connecting passage.

* * * * *

UNITED STATES PATENT AND TRADEMARK OFFICE
CERTIFICATE OF CORRECTION

PATENT NO. : 4,401,072
DATED : August 30, 1983
INVENTOR(S) : Sumio Ito, et al.

It is certified that error appears in the above—identified patent and that said Letters Patent is hereby corrected as shown below:

Change the Name of the Assignee from:

"Toyota Jidosha Kabushiki Kaisha" to

--Toyota Jidosha Kogyo Kabushiki Kaisha--.

Col. 10, line 27, Claim 19, change "6" to --5--.

Signed and Sealed this

Twentieth Day of December 1983

[SEAL]

Attest:

GERALD J. MOSSINGHOFF

Attesting Officer     Commissioner of Patents and Trademarks